United States Patent
Nelke et al.

(10) Patent No.: US 11,023,484 B2
(45) Date of Patent: *Jun. 1, 2021

(54) MODEL-DRIVEN PROFILING JOB GENERATOR FOR DATA SOURCES

(71) Applicant: INTERNATIONAL BUSINESS MACHINES CORPORATION, Armonk, NY (US)

(72) Inventors: Sebastian Nelke, Frickenhausen (DE); Martin Oberhofer, Bondorf (DE); Yannick Saillet, Stuttgart (DE); Jens P. Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/832,840

(22) Filed: Dec. 6, 2017

(65) Prior Publication Data

US 2018/0096038 A1    Apr. 5, 2018

Related U.S. Application Data

(63) Continuation of application No. 15/228,004, filed on Aug. 4, 2016.

(51) Int. Cl.
*G06F 16/25* (2019.01)

(52) U.S. Cl.
CPC ................. *G06F 16/254* (2019.01)

(58) Field of Classification Search
CPC ............ G06F 17/30563; G06F 16/254
(Continued)

(56) References Cited

U.S. PATENT DOCUMENTS 6,604,110 B1 *  8/2003  Savage ................ G06F 16/254
                                                     707/602
7,814,470 B2 * 10/2010  Mamou ................. G06Q 10/10
                                                     707/687

(Continued)

FOREIGN PATENT DOCUMENTS

CN          103279542 A    9/2013
WO        2013014558 A1    1/2013

OTHER PUBLICATIONS

IBM,"Innproving Business Performance Insight . . . with Business Intelligence and Business Process Management", Redbooks, Aug. 2006, 460 pages printed. (Year: 2006).*

(Continued)

*Primary Examiner* — Tony Mahmoudi
*Assistant Examiner* — Michael Le
(74) *Attorney, Agent, or Firm* — Robert C. Bunker

(57) ABSTRACT

Embodiments of the present invention disclose generating a data profiling jobs for source data in a data processing system, the source data being described by at least one source functional data model. A target functional data model is provided, for describing target data that can be generated from the source data. One or more source functional data models are identified that correspond to the target functional data model. At least one functional source-to-target model mapping is associated to at least one source-target pair based on the target functional data model and identified source functional data models. A physical source-to-target model mapping for at least one source-target pair based on the logical source-to-target model mapping is calculated. For all physical source attributes, the needed data profiling jobs are generated based on the target attribute for analyzing the physical source attributes.

7 Claims, 4 Drawing Sheets

(58) Field of Classification Search
USPC .......................................................... 707/602
See application file for complete search history.

(56) References Cited

U.S. PATENT DOCUMENTS

| | | | | |
|---|---|---|---|---|
| 2002/0147725 | A1* | 10/2002 | Janssen | G06F 16/221 |
| 2003/0120651 | A1* | 6/2003 | Bernstein | G06F 16/86 |
| 2004/0093344 | A1* | 5/2004 | Berger | G06F 16/25 |
| 2004/0177075 | A1* | 9/2004 | Rangadass | G06F 17/30563 |
| 2005/0004831 | A1* | 1/2005 | Najmi | G06Q 10/06 705/7.22 |
| 2005/0108631 | A1* | 5/2005 | Annorin | G06Q 10/00 715/234 |
| 2005/0182739 | A1* | 8/2005 | Dasu | G06Q 10/00 706/47 |
| 2005/0222931 | A1* | 10/2005 | Mamou | G06F 16/254 705/35 |
| 2005/0223109 | A1* | 10/2005 | Mamou | G06F 16/254 709/232 |
| 2005/0227828 | A1* | 10/2005 | Wu | A63B 21/0628 482/94 |
| 2005/0228728 | A1* | 10/2005 | Stromquist | G06Q 40/12 705/30 |
| 2005/0228808 | A1* | 10/2005 | Mamou | G16H 70/00 |
| 2005/0235274 | A1* | 10/2005 | Mamou | G06Q 10/10 717/136 |
| 2007/0074155 | A1 | 3/2007 | Ama et al. | |
| 2007/0136324 | A1* | 6/2007 | Xu | G06F 16/254 |
| 2007/0255741 | A1* | 11/2007 | Geiger | G06F 16/24573 |
| 2009/0055828 | A1* | 2/2009 | McLaren | G06Q 30/02 718/103 |
| 2010/0107244 | A1* | 4/2010 | Li | G06F 21/577 726/22 |
| 2011/0191277 | A1* | 8/2011 | Ag ndez Dominguez | G06N 5/025 706/12 |
| 2012/0233182 | A1 | 9/2012 | Baudel et al. | |
| 2013/0085991 | A1* | 4/2013 | Welden | G06F 16/213 707/634 |
| 2014/0280218 | A1 | 9/2014 | Ryan et al. | |
| 2014/0310231 | A1* | 10/2014 | Sampathkumaran | G06F 16/254 707/602 |
| 2015/0347472 | A1* | 12/2015 | Gupta | G06F 16/282 707/805 |
| 2017/0091388 | A1* | 3/2017 | Zolla | G06Q 30/0201 |
| 2017/0116307 | A1* | 4/2017 | Kapoor | G06F 16/213 |

OTHER PUBLICATIONS

Oracle, "Oracle Data Profiling and Oracle Data Quality for Data Integrator", Sample Tutorial, Jan. 2011, 35 pages (Year: 2011).*

Dorr et al., "Using Data Profiling, Data Quality, and Data monitoring to Improve Enterprise Information", www.asq.org, SQP vol. 13, No. 4, 2011, 10 pages (Year: 2011).*

IBM, "Pathway to master data management with master data integration from IBM", whitepaper, Nov. 2005, 32 pages. (Year: 2005).*

Maunendra Desarkar, "Data Profiling for ETL processes", Indian Institute of Technology, 2004 (Year: 2004).*

Dakrory et al., "Automated ETL Testing on the Data Quality of a Data Warehouse", International Journal of Computer Applications, vol. 131-No. 16, pp. 9-16, Dec. 2015 (Year: 2015).*

IBM, "Profiling: Take the first step toward assuring data quality," A discussion of information integration solutions, WebSphere. software, Nov. 2005, Copyright IBM Corporation 2005, pp. 1-16.

Pending U.S. Appl. No. 15/228,004, filed Aug. 4, 2016, entitled: "Model-Driven Profiling Job Generator for Data Sources", 35 pages.

IBM: List of IBM Patents or Patent Applications Treated as Related (Appendix P), Jan. 19, 2018, 2 pages.

* cited by examiner

MODEL-DRIVEN PROFILING JOB GENERATOR FOR DATA SOURCES

BACKGROUND

The present invention relates generally to the field of digital computer systems, and more particularly to generating data profiling jobs.

Data profiling is the process involving an initial analysis of existing data on multiple source systems to ensure that the data that is going to be loaded meet the expectation of the target and to define ETL (extract, transform, and load) processes. The data are extracted from the source systems using ETL processes. Data profiling analyzes the data to retrieve information for each analyzed columns, such as their inferred types, general statistics about the values it contains, common formats, value distributions, etc. With this information, the user can define the valid range of values for each column and measure the number of records, which are outside this valid range. However, due to system constraints such as the number of attributes in the source system it may be impossible to blindly just analyze everything in the data source for time and budget reasons.

SUMMARY

Embodiments of the present invention disclose a method, computer program product, and system for generating data profiling jobs for source data in a data processing system, the data processing system comprising at least one data source system and a target system forming at least one source-target pair, the source data being described by at least one source functional data model.

A target functional data model is provided, for describing target data that can be generated from the source data, wherein each of the source and target functional models is physically implementable in the data processing system by a corresponding physical data model. One or more source functional data models are identified that correspond to the target functional data model. At least one functional source-to-target model mapping is associated to at least one source-target pair based on the target functional data model and identified source functional data models, the functional source-to-target model mapping indicate data rules for generating the target data from the source data. A physical source-to-target model mapping for at least one source-target pair based on the logical source-to-target model mapping is calculated. At least one corresponding source attribute in the physical source data models for a target attribute of the target functional data model is calculated, the calculation is performed by: identifying one or more corresponding physical target attributes in the physical target data model for the target attribute in the functional target data model, identifying data rules associated with the identified physical target attributes based on the physical source-to-target model mappings, and tracing the identified physical target attributes to the physical source attributes based on the identified data rules. For all physical source attributes, the needed data profiling jobs are generated based on the target attribute for analyzing the physical source attributes.

DETAILED DESCRIPTION

Figure 1:
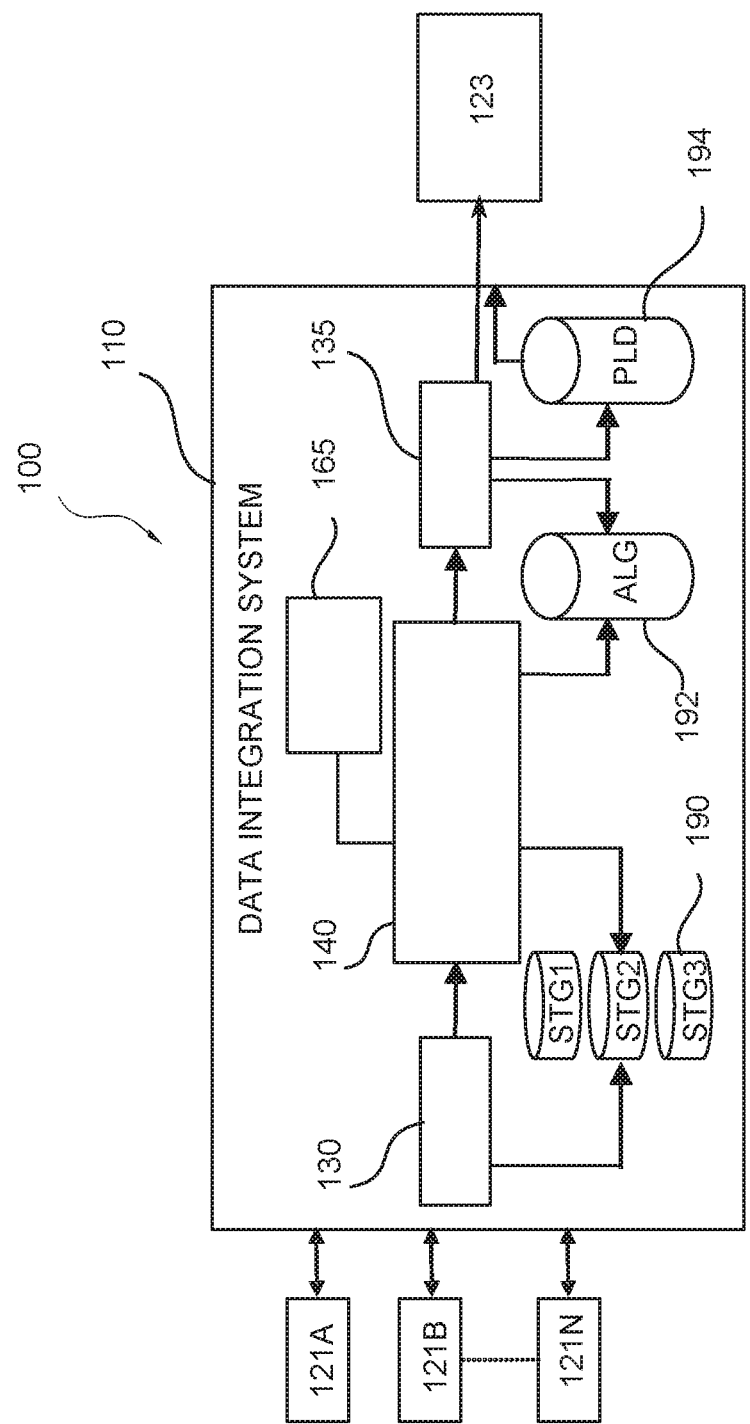
FIG. 1 is a functional block diagram illustrating depicts a data processing system, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

For large information integration projects it is usually time and cost prohibitive to even try to analyze all fields in all tables in all data sources. This is because existing systems may have source systems may have several thousand attributes and more. The size of a single source system can be in Terabyte (TB) range. In addition, the time limitation of a few weeks maximum to complete the source system analysis does not allow to blindly create profiling jobs for all attributes manually, and does not allow to execute all profiling jobs for all fields in all source systems. The present method may overcome such problems by providing a selective on-demand profiling. Starting from the target may reduce the amount of data profiling to the minimum required to ensure that the data from the source meet that expectation of the target. In other words, coming from the target on the functional level with a mapping how the target correlates to the sources in question may allow to generate all the profiling required for only the data one care about.

The present method provides a model-driven data profiling job generation and profiling result that are understood in terms of the target system requirement. The job generation may further be harnessed and improved by generating only data profiling jobs for attributes in source systems based on metadata and appropriate functional source-to-target mappings indicating that this source system attributes are actually migrated to new target systems. The benefits may be reduction of actual data profiling done based on what's actual needed reducing project time and eliminating manual labor to build the profiling tasks, quicker and improved understanding on what the profiling results mean since they are linked to their target and error avoidance.

The present method may further have the advantage of reducing profiling runtime since it is only profiled what is required. This is in contrast to a conventional method that blindly execute the profiling on each source attribute.

Another advantage may reside in the reduction of cost due to reduction of required compute resources, reduction of cost due to reduction of manual labor, reduction of errors due to full automation and improved results—since the data profiling results are automatically interpreted in the context of the metadata used for the data profiling job generation. For example, the functional model of the target may be derived from functional requirements engineering systems.

The data processing system may for example comprise a data warehouse system or a Master Data Management (MDM) system or a system comprising a source system and a corresponding target system that comprises data obtained using data from the source system.

According to one embodiment, generating the target data comprises extracting, transforming and preloading the source data. The method further comprises: executing the generated data profiling jobs resulting in profiling data, and using the profiling data in association with metadata descriptive of the target system for generating data quality monitoring tasks for monitoring transformed data and preloaded data.

The present method may assess the data quality of a source system which is a tedious procedure. Since the profiling tasks are generated based on metadata information from the target, monitoring data quality improvements by re-running them during ETL cleansing job development can surface how much progress has been made to eliminate the data quality issues improving project governance.

According to one embodiment, the generating of the data quality monitoring task comprising: generating a quality metric for each of the transformed and preloaded data, the quality metric representing a validity measure defined by a predefined data quality measurement rule.

This embodiment may have the advantage of defining rules that monitored data should verify in order to be considered as good data e.g. for analysis. This may enable a less error prone analysis of data in the data processing system.

According to one embodiment, the method further comprises: executing the generated data profiling jobs resulting in profiling data; generating an ETL task using the profiling data and the data rules of the physical source-to-target model mappings; executing the ETL task for generating at least part of the target data. This may enable to speed up the ETL process as it runs on necessary data only. This is in contrast to conventional methods that run on whole source data to perform an ETL process.

According to one embodiment, an ETL task is generated using the data rules of the physical source-to-target model mappings. The method further comprises: executing the generated data profiling jobs resulting in profiling data; updating the ETL task using the profiling data.

According to one embodiment, the method further comprises updating the target data by executing the updated ETL task.

These embodiments may have the advantage in particular for systems that experience frequent data updates and changes of source data. This may provide an up-to-date data for reliable analysis.

According to one embodiment, the method further comprises triggering execution of the generated data profiling jobs by a data profiling tool of the data processing system. This may have the advantage of seamlessly integrating the present method in existing systems.

According to one embodiment, the data profiling jobs comprising at least one of: a cross-domain analysis if the target attribute is a non-nullable attribute and associated with a check table for checking values of the target attribute; a column analysis if the target attribute is a non-nullable attribute; a primary key analysis, if the target attribute is marked as being a primary key or part of a compound primary key; a referential integrity analysis, if the target attribute is a foreign key.

According to one embodiment, the functional data model of the target comprises for each attribute in formation indicating at least one of: the logical data type of the attribute, the logical field length of the attribute, constraints on the attribute such as a nullable, non-nullable and default values constraint, if the attribute is part of a primary or foreign key, if the attribute is associated with a check table for checking values of the attribute, user data rules for the attribute values, a mapping to the physical data model that corresponds to the attribute.

These embodiments may provide enriched data or metadata for an accurate generation of the profiling jobs.

The present invention will now be described in detail with reference to the Figures. FIG. 1 depicts an example of a data processing system 100 such as data warehouse system. The data processing system comprises a data integration system 110. The data integration system 110 comprises various components, including one or more extraction modules 130, one or more transformation modules 140, and one of more loading modules 135, as well as a data discovery analyzer 165. Each of the components of data integration system 110 may be implemented by any combination of software and/or hardware modules or processing units. The extraction module 130 may extract data from one or more source systems 121A-N into staging (STG) storages 190. The staging storages 190 may serve as a landing or staging area where extracted data lands eliminating the need to repeat an extraction if anything goes wrong. A staging storage 190 may exist, for example, once per source system and may be modeled after the corresponding source. In the staging areas the initial data profiling may be done.

The transformation module 140 may transform the data in the staging storages 190 and may store the transformed data in the repository 192. Repository 192 may for example be used as an alignment (ALG) area: and may exist once for all source systems 121A-N which means there is a structural alignment to be done from STG 190 to ALG 192. In this area, cleansing on all data from all source systems may be performed. This area may be modeled as closely as possible after the target system with necessary adaptions to allow all records from all source systems being stored in this model.

The loading module 135 may generate output of the transformed data for a target system 123. The output may be stored in a preload repository 194 before being loaded into the target system 123. the preload repository may provide a preload (PLD) area which may exist once for all source systems and may reflect the target model 1:1 relationship. For example, a record which violates structural constraints by the target system may not be moved from ALG 192 to PLD 194.

Although shown separate, the functionality of any one of these components (e.g., extraction module 130 and transformation module 140) may be combined into a single device or process or split among multiple devices or processes.

For extracting, transforming and loading (ETL) data from the source system 121A-N to the target system 123, the data integration system 110 may execute instructions e.g. in the form of SQL statements for performing the ETL process.

The data integration system 110 may be an ETL engine such as an IBM® InfoSphere® DataStage®, Informatica PowerCenter, or Oracle Warehouse Builder engine. The data discovery analyzer 165 may be, for example, an IBM® Information Analyzer or IBM® InfoSphere® Discovery tool. IBM, DataStage, and InfoSphere are trademarks of International Business Machines Corporation, registered in many jurisdictions worldwide. Other product and service names might be trademarks of other companies.

The staging storages 190 and repositories 192 and 194 may or may not be part of the data integration system 110. In one example, the data integration system 110 may be connected via a network to the at least one of staging storages 190 and repositories 192 and 194.

Figure 2:
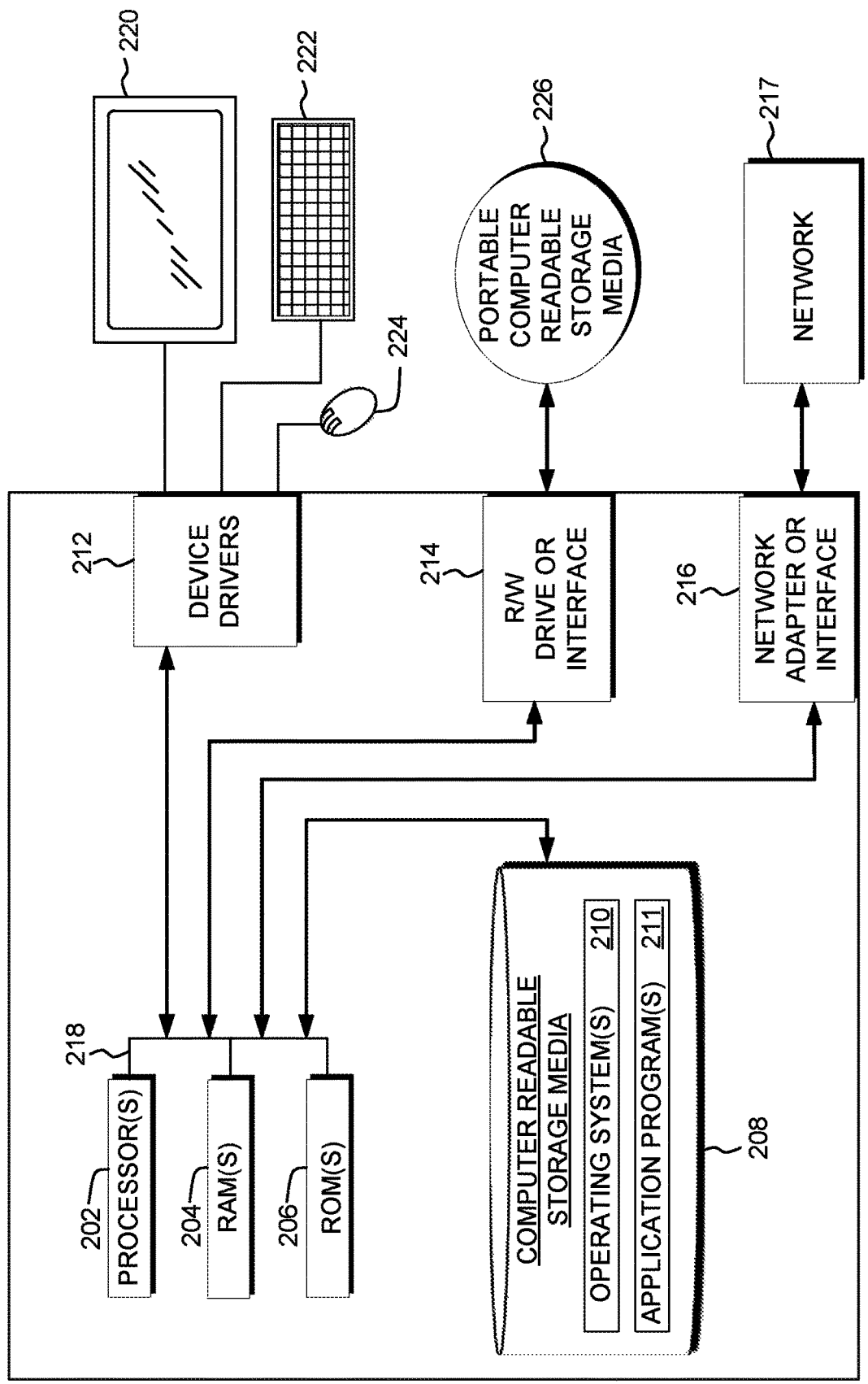
FIG. 2 depicts a block diagram of components of the computer system, in accordance with an embodiment of the present invention.

Referring to FIG. 2, FIG. 2 depicts a block diagram of components of system 110 of FIG. 1, in accordance with an embodiment of the present invention. It should be appreciated that FIG. 2 provides only an illustration of one implementation and does not imply any limitations with regard to the environments in which different embodiments may be implemented. Many modifications to the depicted environment may be made.

System 110 may include one or more processors 202, one or more computer-readable RAMs 204, one or more computer-readable ROMs 206, one or more computer readable storage media 208, device drivers 212, read/write drive or interface 214, network adapter or interface 216, all interconnected over a communications fabric 218. Communications fabric 218 may be implemented with any architecture designed for passing data and/or control information between processors (such as microprocessors, communications and network processors, etc.), system memory, peripheral devices, and any other hardware components within a system.

One or more operating systems 210, and one or more application programs 211 are stored on one or more of the computer readable storage media 208 for execution by one or more of the processors 202 via one or more of the respective RAMs 204 (which typically include cache memory). In the illustrated embodiment, each of the computer readable storage media 208 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

System 110 may also include a R/W drive or interface 214 to read from and write to one or more portable computer readable storage media 226. Application programs 211 on system 110 may be stored on one or more of the portable computer readable storage media 226, read via the respective R/W drive or interface 214 and loaded into the respective computer readable storage media 208.

System 110 may also include a network adapter or interface 216, such as a TCP/IP adapter card or wireless communication adapter (such as a 4G wireless communication adapter using OFDMA technology) for connection to a network 217. Application programs 211 on system 110 may be downloaded to the computing device from an external computer or external storage device via a network (for example, the Internet, a local area network or other wide area network or wireless network) and network adapter or interface 216. From the network adapter or interface 216, the programs may be loaded onto computer readable storage media 208. The network may comprise copper wires, optical fibers, wireless transmission, routers, firewalls, switches, gateway computers and/or edge servers.

System 110 may also include a display screen 220, a keyboard or keypad 222, and a computer mouse or touchpad 224. Device drivers 212 interface to display screen 220 for imaging, to keyboard or keypad 222, to computer mouse or touchpad 224, and/or to display screen 220 for pressure sensing of alphanumeric character entry and user selections.

The device drivers 212, R/W drive or interface 214 and network adapter or interface 216 may comprise hardware and software (stored on computer readable storage media 208 and/or ROM 206).

Figure 3:
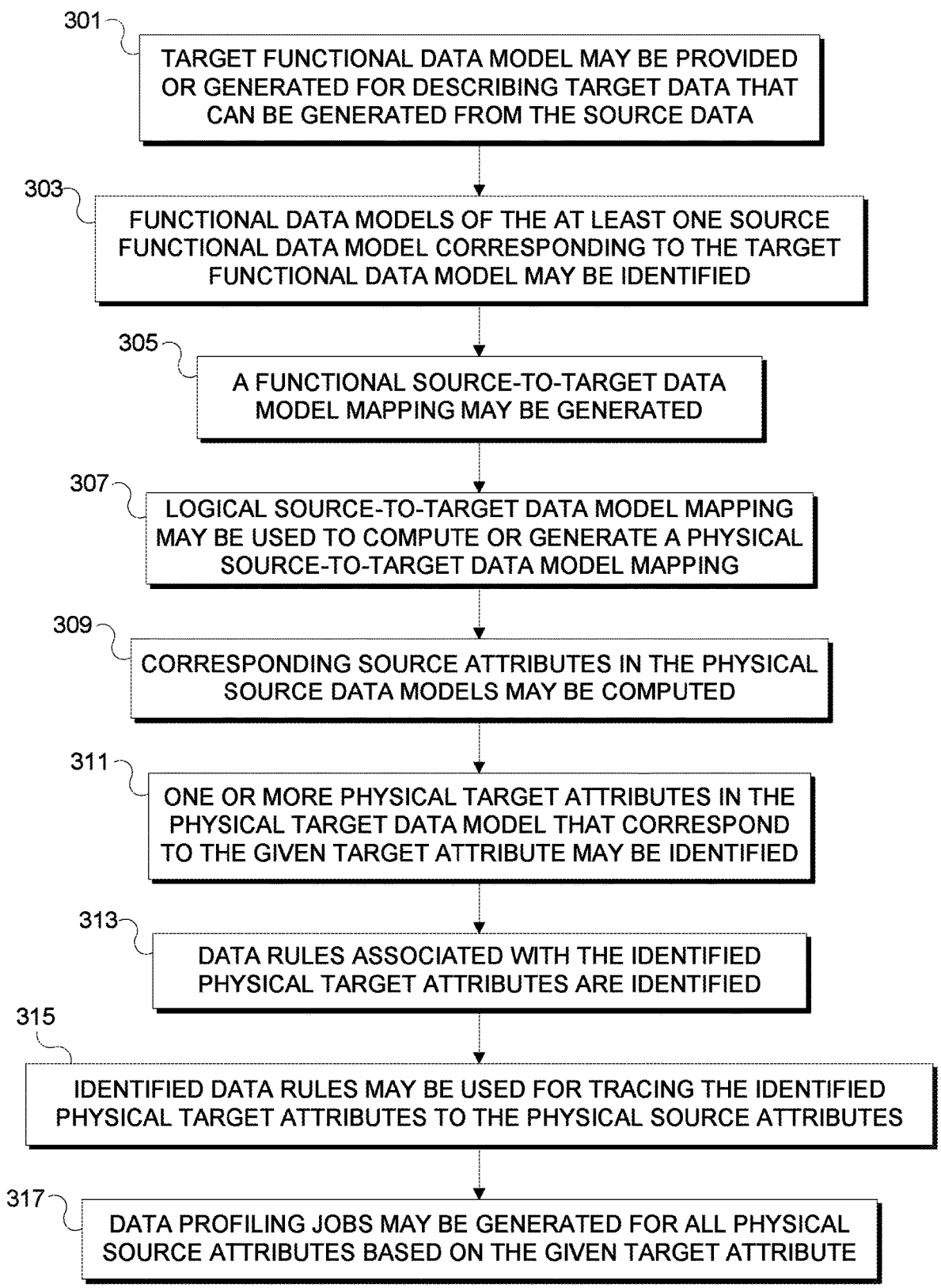
FIG. 3 is a flowchart depicting operational steps of generating data profiling jobs, in accordance with an embodiment of the present invention.

Referring to FIG. 3, FIG. 3 is a flowchart of a method for generating data profiling jobs for source data e.g. in a data warehouse system 100. The data warehouse system 100 comprises one or more source-target pairs 121A-N-123 (e.g. N pairs). For example, source system 121A may form a source-target pair with the target system 123.

The source data that is stored in the source systems 121A-N may be described using at least one functional or logical data model. In one example, each source system 121A-N may be associated with a respective functional source data model that describes source data in that source system. The functional source data model may provide a functional description for tables and fields in the source data which is independent from the underlying persistency software used. The functional source data model may for example include primary key information, foreign-key relationships (FK relationships), constraints (e.g. uniqueness), etc.

In step 301, a target functional data model may be provided or generated for describing target data that can be generated from the source data. The target functional data model may be defined so as to comprise for each attribute of the target data: the logical data type of the attribute, the logical field length of the attribute, the constraints on the attribute such as nullable, non-nullable, default values constraint, etc. The target functional data model may further indicate if the attribute is part of a key (primary key (PK) or foreign key (FK)). The target functional data model may further indicate if the attribute is backed by a check/lookup table (e.g. captured in a FK relationship) for checking values of the attribute. The target functional data model may further indicate if there are some user defined rules for the attribute. The target functional data model may further indicate a corresponding appropriate mapping of the attribute to the physical data model.

Each of the source and target functional data models can be physically implemented in the data warehouse system 100 by a corresponding physical data model that takes into account for example hardware constraints of the data warehouse system. A physical data model may be a technical description of how a logical data model is materialized within a concrete persistency software (e.g. DB2, Oracle, etc.). For example, for the same logical data model the physical data models for different persistency software solutions may be different because they support different data types, etc. There may for example be a 1:1 relationship between the logical data model and the physical data model and a mapping between the two.

In step 303, one or more source functional data models of the at least one source functional data model corresponding to the target functional data model may be identified. Depending on how the target data is generated the resulting target data may be the results of processing only part of the source systems. Thus the functional target data model that describes the target data may only be mapped to part of the functional source data models of source systems that can be used to generate the target data.

In step 305, a functional source-to-target data model mapping may be generated or provided per source-target pair 121A-N-123 of the at least one source-target pair. This may be performed using the target functional data model and the identified source functional data models. The functional source-to-target model mapping may indicate data rules for generating the target data from the source data. In other words, the functional source-to-target data model mapping may be defined between each unique pair of source and target system and describes how the fields in the functional source data model of the source system 121A-N correspond from a functional perspective to the functional target data model of the target system 123. As shown by example in FIG. 4, for three source systems and one target system there are three unique pairs of source and target systems possible—thus there exist three different functional or logical source-to-target data model (FS2T) mappings for each unique pair. FS2T mappings related may be available in electronically form.

The logical or functional mappings may provide a method for representing the high level user-defined specifications that only define what the mappings are, as low level ones that describe how to execute the mappings for a given event or a given business data change (i.e., how to interpret the high level mappings at run-time to update process execution data in the warehouse).

For example, a mapping captures the relationship between one or more attributes in a source system to the attributes in the data target. Each table that exists in the target data has a mapping or target table mapping. A mapping defines which tables from the data sources associated populate the columns of the target table. Each column of the target table may have a mapping expression that describes how it is populated. A target table can have more than one mapping in some situations. For example, one might have a mapping to describe how to populate a first user table from a second user and another mapping to define how to populate the table when the source is from a third user. One can also create a mapping that defines how to populate the table during an initial load and another mapping that defines the delta load for the table.

In step 307, for each source target pair 121A-N-123 of the at least one source-target pair, the logical source-to-target data model mapping may be used to compute or generate a physical source-to-target data model mapping. This may be performed using a translator that may combine the logical source-target data model templates with appropriate physical operators that correspond to specific ETL engines in order to automatically generate physical mappings from the logical ones. The functional and the physical source-to-target data model mappings may be stored in the data warehouse system 100 e.g. in the data integration system 101. The physical source-to-target data model mappings may be defined in a specific implementation language such as SQL, XML and C.

In step 309, for a given target attribute of the target functional data model all the corresponding source attributes in the physical source data models may be computed as follows (e.g. steps 311, 313, 315, and 317). The given target attribute may be user defined. In another example, the given target attribute may be randomly selected.

In step 311, one or more physical target attributes in the physical target data model that correspond to the given target attribute may be identified. This may for example be performed by using the information associated with the target attribute in the logical target data model such as the appropriate mapping of the given attribute to the physical data model.

In step 313, each of the physical source-to-target model mappings may be used for identifying data rules associated with the identified physical target attributes. For example, which data rules are used to generate the identified physical target attributes. This may for example be one by identifying data rules that refers to the identified physical target attributes.

In step 315, the identified data rules may be used for tracing the identified physical target attributes to the physical source attributes. For example, the data rules may have indication to the physical source attributes that are used to generated the identified physical target attributes.

In step 317, data profiling jobs may be generated for all physical source attributes based on the given target attribute. For example, if the given target attribute is a non-nullable attribute a column analysis may be generated as data profiling job. Column analysis may compute statistics (e.g., cardinality, number of null values, frequency distributions, recurring formats, inferred types, etc.) for each of the physical source attributes.

In another example, if the given attribute is a non-nullable attribute and is associated with a check table for cross checking values of the target attribute against the check table, a cross domain analysis may be performed. The cross-domain analysis can be used to identify PK/FK relationships between tables.

Steps 301-317 may automatically be performed e.g. in response to storing the source data in the source systems or may be performed on a periodic basis.

Figure 4:
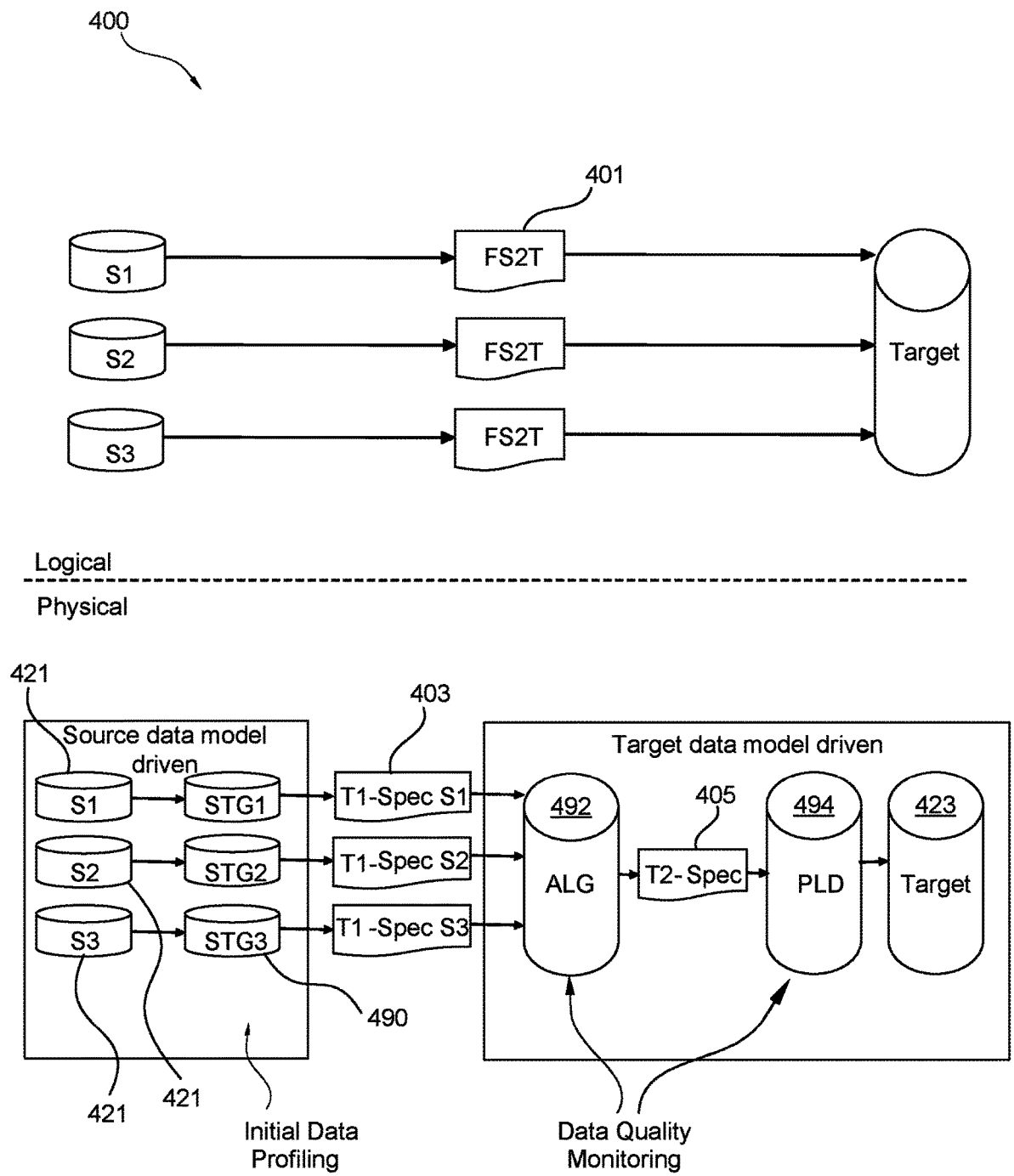
FIG. 4 illustrates an exemplary data warehouse system for the logical and corresponding physical model mappings, in accordance with an embodiment of the present invention.

FIG. 4 illustrates for an example data warehouse system 400 the logical and corresponding physical model mappings. For each FS2T 401 there is (since ETL jobs and data profiling all work on physical data models on the physical layer) a physical data model mapping between STG 490 and ALG 492 (FIG. 4) where the physical data model of STG 490 is traceable to the FS2T 401 since STG 490 is modeled after the source system 421. T2-Spec 405 may be the same for all FS2T 401 between ALG 492 and PLD 494. The T2-Spec 405 may link the physical data model of the target 423 from PLD 494 to ALG 492 which is linked to STG 490 via the T1-Spec 403, establishing traceability of the fields on physical data model level.

The information that may be received by the system of FIG. 4 may include the logical data type, the logical field length, constraints (nullable, non-nullable, default values, etc.), if its part of a key (PK or FK), whether the attribute is backed by a check/lookup table (captured in a FK relationship), user defined rules for the data if any, and its corresponding appropriate mapping to the physical data model, for each attribute in the logical data model of the target.

In various embodiments, a complete list of all FS2T mappings related to the logical data model of the target system may be received electronically. Various algorithms may be implemented in which the relationships to of the above described information may be analyzed. For example, a column analysis may be useful to determine actual min/max values, inferred type vs. declared type, format patterns, or frequency distributions. In various embodiments a domain analysis may be utilized that validates if a column has only values permissible by the corresponding lookup/check table.

In various embodiments, for each attribute in the logical or functional target data model, the target system may identify, for each FS2T, the corresponding attributes in the functional source data model. For each attribute in the functional source data model identify the corresponding attribute with all constraints in PLD using the T2-Spec. The appropriate T1-Spec and T2-Spec may be used to follow data from PLD to ALG to STG. Attributes may be generated in the STG that are necessary for profiling tasks as required by the target data model. The generated initial profiling tasks may be executed in order to allow the interpretation and visualization of the results in STG with associated appropriate metadata from the target system. Tasks for ALG and PLD may be generated in order to monitor tasks for data quality.

In various embodiments, for an attribute in the logical data model of the target, which is not-nullable, not backed by a lookup/check table and has no business rules applicable, only column analysis profiling task may be generated for such an attribute. A domain analysis task would not be generated since if it is not needed. In cases in which a null value is found, and the metadata of the logical data model of the target required all values to be different from null with the not-nullable constraint, it may be classified as a violation of the model.

In various embodiments, for an attribute in the logical data model of the target which is not-nullable and has a check/lookup table associated with it, a column analysis and domain analysis jobs, as described above, may be generated. For example, a data profiling job may be represented as an osh-script which can be generated if all necessary metadata is known or received In another example, a computer-implemented method for generating data profiling jobs for source data is provided. The method comprises: providing a source data model for the source data, a target data model for target data, and a source-to-target mapping between the source data model and the target data model; analyzing the target data model to identify attributes of target data; determining a first set of data rules for the attributes based on the target data model and associated metadata; tracing the first attributes relating to the target data to associated attributes relating to the source data using the source-to-target mapping; determining a second set of data rules for the associated attributes of the source data based on the source data model and associated metadata; generating data profiling jobs for the associated attributes of the source data based on the determined first and second set of data rules.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for generating data profiling jobs for source data in a data processing system, the data processing system comprising at least one data source system and a target system forming at least one source-target pair, the source data being described by at least one source functional data model, the method comprising:
    providing a target functional data model for describing target data that is generated from the source data, wherein each of the source and target functional models is implemented in the data processing system by a corresponding physical data model, and wherein the target functional data model comprises target attribute information indicating constraints on a target attribute, wherein the constraints include nullable, non-nullable, and default values, and wherein the target attribute information further indicates (i) the logical data type of the target attribute, (ii) the logical field length of the target attribute, (iii) if the target attribute is part of a primary or foreign key, (iv) if the target attribute is associated with a check table for checking values of the attribute and (v) user data rules for target attribute values;
    identifying a source functional data model of the at least one source functional data model corresponding to the target functional data model;
    associating at least one functional source-to-target mapping to at least one source-target pair based on the target functional data model and identified source functional data model, the functional source-to-target model mapping indicating data rules for generating the target data from the source data;
    calculating a physical source-to-target model mapping for the at least one source-target pair based on a logical source-to-target model mapping, wherein the calculated physical source-to-target model mapping is calculated using a translator that combines logical source-to-target data model templates with corresponding physical operators of a specific extract, transform, and load (ETL) engine;
    calculating at least one corresponding source attribute in physical source data models for the target attribute of the target functional data model;
    generating, for at least one physical source attribute, data profiling jobs based on the target attribute for analyzing the at least one physical source attribute, wherein the data profiling jobs include a cross-domain analysis if the target attribute is a non-nullable attribute and associated with a check table for checking values of the target attribute, and wherein the data profiling jobs further include a referential integrity analysis if the target attribute is a foreign key, and a primary key analysis in response to determining that the target attribute is the primary key or part of the compound key; and
    executing the generated data profiling jobs by a data profiling tool of the data processing system.

2. The method of claim 1, wherein calculating the physical source-to-target model mapping further comprises:
    identifying one or more corresponding physical target attributes in the physical target data model for the target attribute in the target functional data model;
    identifying data rules associated with the identified physical target attributes based on the physical source-to-target model mapping; and
    tracing the identified physical target attributes to the physical source attributes based on the identified data rules.

3. The method of claim 1, wherein generating the target data comprises extracting, transforming and preloading the source data, further comprises:
    executing the generated data profiling jobs resulting in profiling data; and
    generating data quality monitoring tasks for monitoring transformed data and preloaded source data based on the profiling data in association with metadata descriptive of the target system.

4. The method of claim 3, wherein generating of the data quality monitoring tasks further comprises: generating a quality metric for at least one of the transformed and preloaded data, the quality metric representing a validity measure based on a predefined data quality measurement rule.

5. The method of claim 1, further comprising:
executing the generated data profiling jobs resulting in profiling data;
generating an extract, transform, and load (ETL) task using the profiling data and the data rules of the physical source-to-target model mappings; and
executing the ETL task for generating at least part of the target data.

6. The method of claim 5, wherein generating the ETL task using the data rules of the physical source-to-target model mapping further comprises:
executing the generated data profiling jobs resulting in profiling data; and
updating the ETL task using the profiling data.

7. The method of claim 6, further comprising: updating the target data by executing the updated ETL task.

\* \* \* \* \*